W. R. HESLEWOOD AND H. F. MOCINE.
PISTON RING.
APPLICATION FILED AUG. 25, 1920.

1,419,672.

Patented June 13, 1922.

INVENTORS
WILLIAM R. HESLEWOOD
HARRY F. MOCINE
BY Chas. E. Townsend,
ATTORNEY

UNITED STATES PATENT OFFICE.

WILLIAM R. HESLEWOOD AND HARRY F. MOCINE, OF OAKLAND, CALIFORNIA, ASSIGNORS TO HARRY F. MOCINE, WILLIAM R. HESLEWOOD, GEORGE J. CARR, AND E. B. KIMBALL, TRUSTEES OF THE M AND H PISTON RING COMPANY.

PISTON RING.

1,419,672.   Specification of Letters Patent.   Patented June 13, 1922.

Application filed August 25, 1920. Serial No. 405,853.

*To all whom it may concern:*

Be it known the we, WILLIAM R. HESLEWOOD and HARRY F. MOCINE, citizens of the United States, residing at Oakland, in the county of Alameda and State of California, have invented a new and useful Improvement in Piston Rings, of which the following is a specification.

This invention relates to a piston ring and particularly that type known as multiple piece or leak-proof rings.

One of the objects of the present invention is to provide a simple, substantial and cheaply manufactured piston ring especially adapted for pistons such as employed in internal combustion engines and the like, and particularly a piston ring which will not only reduce leakage to a minimum, but which will also practically stop all transfer of lubricating oil from the crank case to the combustion chamber.

Another object of the invention is to provide a piston ring consisting of two independent rings placed one above the other and interspaced, said rings being split and circumferentially expansible and having means interposed between the same so as to maintain snug engagement with the upper and lower walls of the piston groove.

Another object of the invention is to provide a novel form of spring wire ring for maintaining the piston rings interspaced, etc.

Further objects will hereinafter appear.

The invention consists of the parts and the construction, combination and arrangement of parts as hereinafter more fully described and claimed, having reference to the accompanying drawings, in which—

Figure 1:
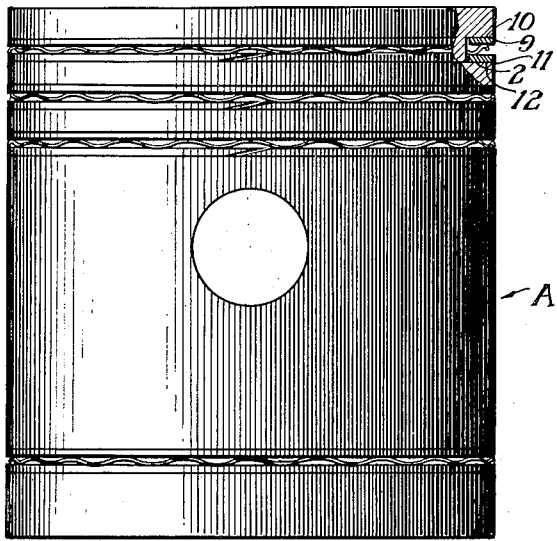
Fig. 1 is a side elevation of the piston showing the application of the invention.
Figure 2:
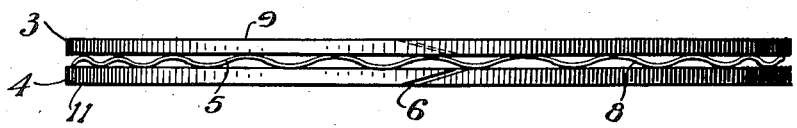
Fig. 2 is a side elevation of one of the piston rings forming the subject matter of the present invention.
Figure 3:
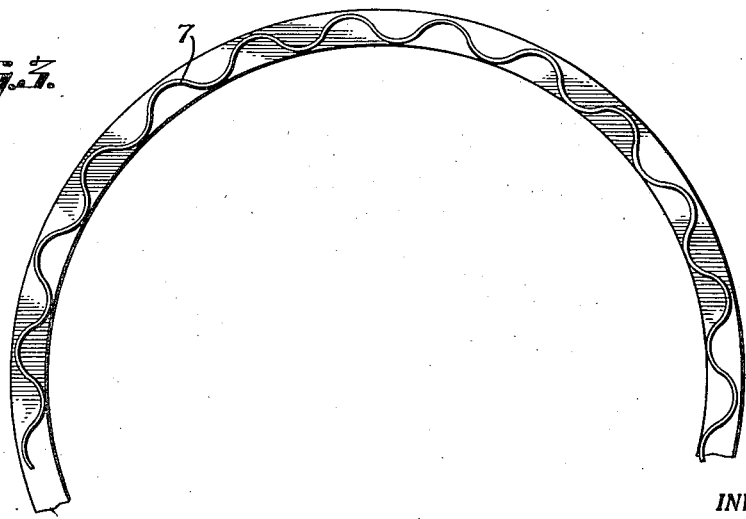
Fig. 3 is a plan view partially broken away showing the position of the spring wire ring interposed between the piston rings.

Referring to the drawings in detail, A indicates a standard form of piston and 2 the piston ring grooves formed therein. The piston ring forming the subject matter of the present invention consists of two separate rings such as indicated at 3 and 4. These rings are placed one above the other and are interspaced by means of a spring wire ring such as indicated at 5. By referring to Fig. 1, it will be seen that each piston ring consists of two superposed rings and a spacing member, to-wit, the spring wire ring 5 interposed therebetween; a set of rings of this character being placed in each piston ring groove. The rings 3 and 4 are identical in construction, each ring being flat and split as at 6 to permit circumferential expansion of the same. The spring wire ring interposed between the ring sections 3 and 4 is preferably constructed of piano wire or the like and is corrugated, first, horizontally as shown at 7 in Fig. 3, and then vertically as shown at 8, see Figs. 1 and 2. The horizontal corrugations permit expansion and contraction of the wire ring when placing or removing the same with relation to the piston rings and the grooves 2 formed for the reception of the same, while the vertical corrugations form a yielding or spring-like spacer between the ring sections 3 and 4, which force them apart. This is an important feature of the present invention as it maintains the upper surface 9 of the ring 3 in close contact with the upper wall 10 of the piston groove, and similarly the lower face 11 of the ring 4 in close contact with the lower wall 12 of the piston groove, gas or oil leakage around the rings being in this manner, practically speaking, eliminated.

In actual practice we have found that single piece piston rings such as ordinarily employed have a tendency to wear not only on their outer face which contacts with the cylinder wall, but also on their lower and upper faces which contact with the upper and lower walls 10 and 12 of the piston groove. The wear on the upper and lower faces of the piston ring and on the upper and lower walls 10 and 12 of the piston groove is caused by the reciprocal movement of the piston, that is the piston rings tend to drag to a more or less extent with relation to the cylinder wall and they therefore snugly engage the upper wall 10 of the piston groove when the piston is travelling downwardly, and conversely the lower wall 12 of the piston groove when the piston is travelling upwardly. A slight hammer action is in this manner produced, during each reciprocation this hammer action becoming greater and greater as wear takes place. We have further found that the moment any play of the character described begins to take place, a slight pumping action also takes place in each piston ring groove and that oil is transferred upwardly around the rings due to this hammer action or pumping movement; this oil being finally transferred to the combustion chamber of the engine where it causes trouble by fouling the plugs and by forming carbon etc. Such oil leakage is, practically speaking, entirely overcome in the present instance as each section of the present ring here shown is always maintained in snug engagement with the upper and lower wall of the piston groove regardless of the movement of the piston. Gas leakage is similarly reduced and greater efficiency, power output, etc., is obtained from an engine; a marked saving of lubricating oil being at the same time noticed.

While a resilient spacing member of specific design is here shown, it is obvious that any other means capable of producing the result desired may be acquired, similarly that the materials and finish of the several parts employed may be such as the experience and judgment of the manufacturer may dictate or varying uses may demand.

Having thus described our invention, what we claim and desire to secure by Letters Patent is—

1. A piston ring of the character described comprising a pair of superposed circumferentially expansible rings, a spring wire ring interposed between the piston rings, said wire ring being corrugated horizontally and vertically, and means for maintaining said wire ring in a fixed concentric position with relation to the piston rings.

2. A piston ring of the character described comprising a pair of superposed circumferentially expansible rings, and a spring wire ring interposed between the piston rings, said ring being corrugated both horizontally and vertically.

3. A piston ring comprising a pair of flat superposed and circumferentially expansible rings, and a spring wire ring interposed between said flat superposed rings, the said wire ring being corrugated horizontally the width of the rings, and also corrugated vertically to maintain a spacing between the rings.

In testimony whereof we have hereunto set our hands in the presence of two subscribing witnesses.

WILLIAM R. HESLEWOOD.
HARRY F. MOCINE.

Witnesses:
W. W. HEALEY,
M. E. EWING.